Patented Sept. 17, 1940

2,215,040

UNITED STATES PATENT OFFICE 2,215,040

FLUORESCENT GLASS

Harrison P. Hood, Corning, N. Y., assignor to Corning Glass Works, Corning, N. Y., a corporation of New York No Drawing. Application February 8, 1939,
Serial No. 255,346

2 Claims. (Cl. 250—81)

This invention relates to glass which will fluoresce when irradiated with ultra-violet radiations. A demand for such glasses has been created by the increasing use of luminous discharge tubes for signs and illuminated advertising displays. With the exception of glasses containing uranium or certain metallic sulfides, the prior fluorescent glasses have a maximum sensitivity for radiations in the short wave ultra-violet, particularly in the neighborhood of 2540—A, and little if any in the neighborhood of 3650—A. It has therefore been necessary to keep the iron content of such glasses at a minimum in order to avoid the absorption of short wave ultra-violet radiations thereby and a corresponding decrease in the fluorescing efficiency of the glass. Prior fluorescing agents for glass which are sensitive to ultra-violet radiations in the neighborhood of 3650—A do not produce a desirable white light when irradiated and some of them, such as the sulfides, undergo objectionable decomposition on being incorporated into the glass melt and hence require a special melting technique.

The primary object of this invention is to produce a glass which is particularly sensitive to ultra-violet radiations in the neighborhood of 3650—A and which will fluoresce white when so irradiated.

The primary object of this invention is to produce a glass which is particularly sensitive to ultra-violet radiations in the neighborhood of 3650—A and which will fluoresce white when so irradiated.

Another object is to produce such a glass without objectionable loss or decomposition of fluorescing agent and without resorting to special melting technique.

The above and other objects may be accomplished by practicing my invention which embodies among its features a reduced glass which contains thallium.

The invention further comprises a member, such as a tube, envelope or screen at least a part of which is composed of the above glass and constituting a part of a lamp producing light waves of 4000—A and shorter.

I have discovered that, when glass batches containing thallium or compounds thereof are melted reducingly, the resulting glasses are particularly sensitive to ultra-violet radiations in the neighborhood of 3650—A and produce a strong white fluorescence when irradiated thereby. When such a batch is reduced by means of elemental sulphur present therein, the fluorescence is reddish in color. The maximum fluorescent effect is obtained with a content of about 7% of thallium calculated as thallous oxide, but as little as .5% will produce an appreciable effect.

The following batch compositions in parts by weight will illustrate glasses which, in accordance with my invention, contain thallium and will fluoresce when irradiated with ultra-violet radiations of about 3650—A.

|  | I | II | III | IV |
|---|---|---|---|---|
| Sand | 92 | 92 | 92 | 92 |
| Borax | 37 | 37 | 37 |  |
| Boric acid |  |  |  | 4 |
| Sodium carbonate | 17 | 17 | 17 | 30 |
| Potassium carbonate | 13 | 13 | 13 |  |
| Alumina hydrate | 4 | 4 | 4 | 4 |
| Barium carbonate |  |  |  | 16 |
| Sugar | 2 | 2 |  |  |
| Sulphur |  |  | 1 |  |
| TlCl | 8 |  | 2 |  |
| Tl(CHO$_2$) |  | 10 |  | 6 |

The glasses resulting from melting the above batches will have the following approximate percentage compositions as calculated from the respective batches:

|  | I | II | III | IV |
|---|---|---|---|---|
| SiO$_2$ | 66.2 | 65.6 | 69.0 | 69.6 |
| Na$_2$O | 11.5 | 11.4 | 12.0 | 13.2 |
| K$_2$O | 5.4 | 5.4 | 5.6 |  |
| B$_2$O$_3$ | 9.7 | 9.7 | 10.1 | 1.7 |
| Al$_2$O$_3$ | 1.9 | 1.9 | 2.0 | 2.0 |
| BaO |  |  |  | 9.3 |
| Tl$_2$O | 5.1 | 6.0 | 1.3 | 4.2 |

It will be noted that batches I and II contain a carbonaceous reducing agent, sugar. This may be omitted, if desired, from batch II and is omitted in batch IV, because thallium formate, contained in these batches, is a carbonaceous compound. Batch III contains sulphur which serves as a reducing agent.

Glasses I and II and IV have a strong white fluorescence when irradiated at wave lengths in the neighborhood of 3650—A. Glass III fluoresces at the same wave length with a reddish or orange color of lower intensity, the difference in color being assumed to be due to the sulphur in the batch and the formation of a sulphide of thallium in the glass.

The fluorescence at 3650—A caused by the presence of thallium is a characteristic only of glasses resulting from the melting of batches which contain reducing agents. The presence of oxidizing agents in the batch destroys the effect and oxidized thallium-containing glasses do not fluoresce appreciably at 3650—A.

Glasses in accordance with my invention may be melted and fabricated in the usual manner into tubes, bulbs, screens or other parts suitable for the production of fluorescent effects when combined with an electric discharge device, arc lamp or other source of ultra-violet radiations.

I claim:

1. A glass which contains thallous oxide which will fluoresce substantially white when irradiated at a wave length of about 3650—A and which is free from second group sulfides.

2. A glass which contains .5% to 7% of thallous oxide which will fluoresce substantially white when irradiated at a wave length of about 3650—A and which is free from second group sulfides.

HARRISON P. HOOD.